(12) United States Patent
Sunaga (10) Patent No.: US 8,557,395 B2
(45) Date of Patent: Oct. 15, 2013

(54) HEAT INSULATOR

(75) Inventor: Susumu Sunaga, Otsuki-cho (JP)

(73) Assignee: Fukai Seisakusho Co., Ltd., Tochigi (JP)

( * ) Notice: Subject to any disclaimer, the term of this patent is extended or adjusted under 35 U.S.C. 154(b) by 0 days.

(21) Appl. No.: 13/003,718

(22) PCT Filed: Jul. 17, 2008

(86) PCT No.: PCT/JP2008/062957
§ 371 (c)(1),
(2), (4) Date: Jan. 11, 2011

(87) PCT Pub. No.: WO2010/007683
PCT Pub. Date: Jan. 21, 2010

(65) Prior Publication Data
US 2011/0111249 A1    May 12, 2011

(51) Int. Cl.
*B21D 13/00*    (2006.01)
*F02B 77/11*    (2006.01)

(52) U.S. Cl.
USPC ........... 428/604; 428/116; 428/178; 52/789.1

(58) Field of Classification Search
USPC ......... 428/116, 158, 164, 174, 178, 179, 180, 428/183, 313.3, 314.2, 596, 185, 186, 604; 52/789.1, 793.1, 798.1; D25/138
See application file for complete search history.

(56) References Cited

U.S. PATENT DOCUMENTS

| | | | | |
|---|---|---|---|---|
| 2,233,592 A | * | 3/1941 | Dunajeff | 428/604 |
| 2,978,006 A | * | 4/1961 | Clemens | 156/210 |
| 3,370,520 A | * | 2/1968 | Mauch | 454/370 |
| 3,561,177 A | * | 2/1971 | Argo et al. | 52/169.14 |
| 3,575,781 A | * | 4/1971 | Pezely | 428/180 |
| 3,960,730 A | * | 6/1976 | Miller, III | 210/321.74 |
| 4,474,172 A | | 10/1984 | Burke | |
| 5,242,735 A | * | 9/1993 | Blankenburg et al. | 428/116 |
| 5,399,406 A | * | 3/1995 | Matsuo et al. | 428/57 |
| D383,311 S | * | 9/1997 | Engberg | D5/61 |
| D416,476 S | * | 11/1999 | Engberg | D8/402 |

(Continued)

FOREIGN PATENT DOCUMENTS

| | | |
|---|---|---|
| GB | 956132 | 4/1964 |
| JP | 2000-136720 | 5/2000 |
| JP | 2000-257441 | 9/2000 |
| JP | 2002-060878 | 2/2002 |

(Continued)

OTHER PUBLICATIONS

Webster's Ninth Collegiate Dictionary, 1987, Merriam Webster.*

*Primary Examiner* — David Sample
*Assistant Examiner* — Adam Krupicka
(74) *Attorney, Agent, or Firm* — Jordan and Hamburg LLP (57) ABSTRACT

A heat insulator is provided which can ensure satisfactory rigidity without increasing plate thickness. A number of convex portions are formed in an aluminum flat plate by embossing in an aligned state so that the flat plate part does not remain linearly between the convex portions. Each one convex portion has a hexagonal shape as viewed planarly, and the longitudinal section thereof, which includes vertices formed by opposing corners of the hexagonal shape, has a circular arc shape. The optimal value of convex height/convex width is a value in an experiment example, i.e., about 16.3% which is a value just before the start of blunting of the percentage performance improvement. From the viewpoint of a satisfactory percentage performance improvement, however, the convex height/convex width value is suitably not less than 12% and not more than 20.0%.

1 Claim, 9 Drawing Sheets

(56) References Cited

U.S. PATENT DOCUMENTS

| D418,745 S | * | 1/2000 | Berger | D8/402 |
|---|---|---|---|---|
| 7,467,680 B2 | * | 12/2008 | Mason | 180/69.2 |
| 7,661,752 B2 | | 2/2010 | Yamazaki | |
| 2007/0000298 A1 | | 1/2007 | Braun et al. | |
| 2008/0155931 A1 | | 7/2008 | Shoji | |

FOREIGN PATENT DOCUMENTS

| JP | 2005-522329 | 7/2005 |
|---|---|---|
| JP | 2005-246418 | 9/2005 |
| JP | 2008-024047 | 2/2008 |
| JP | 2008-180125 | 8/2008 |
| WO | WO-96/24796 | 8/1996 |

* cited by examiner

| No. | PLATE THICKNESS | CONVEX WIDTH | CONVEX HEIGHT | HEIGHT TO WIDTH | BASE WIDTH | PLANE DIMENSION (ONE-SIDE GAP) | MAXIMUM DISPLACEMENT AMOUNT | PERFORMANCE IMPROVEMENT RATE | ACTUAL LENGTH OF CIRCULAR-ARC | MATERIAL EXPANSION RATE |
|---|---|---|---|---|---|---|---|---|---|---|
| 1 | 0.3 | 8 | 0.8 | 10.0% | 10 | 1 | 0.845 |  | 8.211 | 102.1% |
| 2 | 0.3 | 8 | 0.9 | 11.3% | 10 | 1 | 0.779 | 108% | 8.267 | 102.7% |
| 3 | 0.3 | 8 | 1.0 | 12.5% | 10 | 1 | 0.725 | 107% | 8.329 | 103.3% |
| 4 | 0.3 | 8 | 1.1 | 13.8% | 10 | 1 | 0.677 | 107% | 8.397 | 104.0% |
| 5 | 0.3 | 8 | 1.2 | 15.0% | 10 | 1 | 0.636 | 106% | 8.472 | 104.7% |
| 6 | 0.3 | 8 | 1.3 | 16.3% | 10 | 1 | 0.595 | 107% | 8.552 | 105.5% |
| 7 | 0.3 | 8 | 1.4 | 17.5% | 10 | 1 | 0.562 | 106% | 8.638 | 106.4% |
| 8 | 0.3 | 8 | 1.5 | 18.8% | 10 | 1 | 0.532 | 106% | 8.730 | 107.3% |
| 9 | 0.3 | 8 | 1.6 | 20.0% | 10 | 1 | 0.508 | 105% | 8.828 | 108.3% |
| 10 | 0.3 | 8 | 1.7 | 21.3% | 10 | 1 | 0.4852 | 105% | 8.931 | 109.3% |
| 11 | 0.3 | 8 | 1.8 | 22.5% | 10 | 1 | 0.4679 | 104% | 9.040 | 110.4% |
| 12 | 0.3 | 8 | 1.9 | 23.8% | 10 | 1 | 0.448 | 104% | 9.154 | 111.5% |
| 13 | 0.3 | 8 | 2.0 | 25.0% | 10 | 1 | 0.429 | 104% | 9.273 | 112.7% |
| 14 | 0.3 | 8 | 2.1 | 26.3% | 10 | 1 | 0.4119 | 104% | 9.397 | 114.0% |
| 15 | 0.3 | 8 | 2.2 | 27.5% | 10 | 1 | 0.396 | 104% | 9.527 | 115.3% |
| 16 | 0.3 | 8 | 2.3 | 28.8% | 10 | 1 | 0.390 | 101% | 9.661 | 116.6% |
| 17 | 0.3 | 8 | 2.4 | 30.0% | 10 | 1 | 0.380 | 103% | 9.800 | 118.0% |
| 18 | 0.3 | 8 | 2.5 | 31.3% | 10 | 1 | 0.364 | 104% | 9.943 | 119.4% |
| 19 | 0.3 | 8 | 2.6 | 32.5% | 10 | 1 | 0.353 | 103% | 10.091 | 120.9% |
| 20 | 0.3 | 8 | 2.7 | 33.8% | 10 | 1 | 0.297 | 119% | 10.243 | 122.4% |
| 21 | 0.3 | 8 | 2.8 | 35.0% | 10 | 1 | 0.288 | 103% | 10.400 | 124.0% |
| 22 | 0.3 | 8 | 2.9 | 36.3% | 10 | 1 | 0.280 | 103% | 10.560 | 125.6% |
| 23 | 0.3 | 8 | 3.0 | 37.5% | 10 | 1 | 0.2712 | 103% | 10.725 | 127.3% |

Fig. 5

| No. | PLATE THICKNESS | CONVEX WIDTH | CONVEX HEIGHT | HEIGHT TO WIDTH | BASE WIDTH | PLANE DIMENSION (ONE-SIDE GAP) | MAXIMUM DISPLACEMENT AMOUNT AT t0.3 | MAXIMUM DISPLACEMENT AMOUNT AT t0.35 | PERFORMANCE DIFFERENCE WITH RESPECT TO BASE | DISPLACEMENT AMOUNT AT t0.5 |
|---|---|---|---|---|---|---|---|---|---|---|
| 1 | 0.35 | 6 | 0.975 | 16.3% | 7.5 | 0.75 | | | | 0.413 |
| 2 | 0.35 | 8 | 1.300 | 16.3% | 10.0 | 1.00 | | 0.427 | 97% | 0.413 |
| 3 | 0.35 | 10 | 1.625 | 16.3% | 12.5 | 1.25 | 0.452 | 0.323 | 128% | 0.413 |
| 4 | 0.35 | 12 | 1.950 | 16.3% | 15.0 | 1.50 | 0.324 | 0.220 | 188% | 0.413 |
| 5 | 0.35 | 16 | 2.600 | 16.3% | 20.0 | 2.00 | | 0.207 | 200% | 0.413 |
| 6 | 0.35 | 20 | 3.250 | 16.3% | 25.0 | 2.50 | | 0.163 | 254% | 0.413 |

Fig. 6

| No. | PLATE THICKNESS | CONVEX WIDTH | CONVEX HEIGHT | HEIGHT TO WIDTH | BASE WIDTH | PLANE DIMENSION (ONE-SIDE GAP) | MAXIMUM DISPLACEMENT AMOUNT | PERFORMANCE IMPROVEMENT RATE | ACTUAL LENGTH OF CIRCULAR-ARC | MATERIAL EXPANSION RATE |
|---|---|---|---|---|---|---|---|---|---|---|
| 1 | 0.3 | 8.0 | 0.8 | 10.0% | 10 | 1.0 | 0.738 | | 8.211 | 102.1% |
| 2 | 0.3 | 8.0 | 0.8 | 10.0% | 11 | 1.5 | 0.772 | 96% | 8.211 | 101.9% |
| 3 | 0.3 | 8.0 | 0.8 | 10.0% | 12 | 2.0 | 0.786 | 98% | 8.211 | 101.8% |
| 4 | 0.3 | 8.0 | 0.8 | 10.0% | 13 | 2.5 | 0.883 | 89% | 8.211 | 101.6% |
| 5 | 0.3 | 8.0 | 0.8 | 10.0% | 14 | 3.0 | 0.915 | 97% | 8.211 | 101.5% |
| 6 | 0.3 | 8.0 | 0.8 | 10.0% | 15 | 3.5 | 1.008 | 91% | 8.211 | 101.4% |
| 7 | 0.3 | 8.0 | 0.8 | 10.0% | 16 | 4.0 | 0.951 | 106% | 8.211 | 101.3% |

HEAT INSULATOR

BACKGROUND OF THE INVENTION

The present invention relates to a beat insulator suitably used to insulate heat of a catalytic converter, a muffler, or the like of a vehicle.

A heat insulator may be installed at an empty space below a floor of a vehicle. For such a reason; there is a case it has been difficult to form beads so as to sufficiently protrude or to form beads all over the entire surface because of preventing it from interfering with a fuel tube or the like. Generally, to ensure sufficient rigidity of the plate-like body the thickness of the plate-like body is increased. Further, a structure is known in which unevenness is provided to improve the rigidity (see Patent Document 1). Patent Document 1: Japanese patent Application Laid-Open (JP-A) No. 2002-60878.

When the thickness of a heat insulator is increased, a problem arises in that the weight and the cost inevitably increase. Also, when unevenness is formed in a manner such that a flat plate portion remains between recesses in a linear shape, a problem arises in that the sufficient rigidity may not be ensured.

Accordingly, there is a need to provide a plate-like body capable of ensuring sufficient rigidity without thickening a plate.

SUMMARY OF THE INVENTION

According to the invention, a heat insulator is provided sufficient rigidity without increasing the thickness of a plate.

According to a first aspect of the invention, there is provided a heat insulator that includes plural convex portions formed thereon. The convex portion is formed such that a convex height H to a convex width W1 is in the range of from 12% to 20%. The convex portions are arranged in a manner such that a flat plate portion between the convex portions does not remain in a linear shape.

According to a second aspect of the invention, in the heat insulator of the first aspect, the convex width W1 is in the range of from 10 mm to 16 mm.

According to a third aspect of the invention, in the heat Insulator of the first aspect, in which a distance C between the convex portions is 75% or less of a base W2 which is the sum of the distance C/2 and the convex width W1.

According to a fourth aspect of the invention, in the heat insulator of the first aspect, each one of the convex portions is formed in a hexagonal shape in a plan view, and has a longitudinal section thereof, which circular arc shape.

According to a fifth aspect of the invention, in the heat insulator of the first aspect, the convex portion is in a circular shape in a plan view and has a circular-arc-shaped longitudinal section.

DETAILED DESCRIPTION OF SPECIFIC EMBODIMENTS

Figure 1:
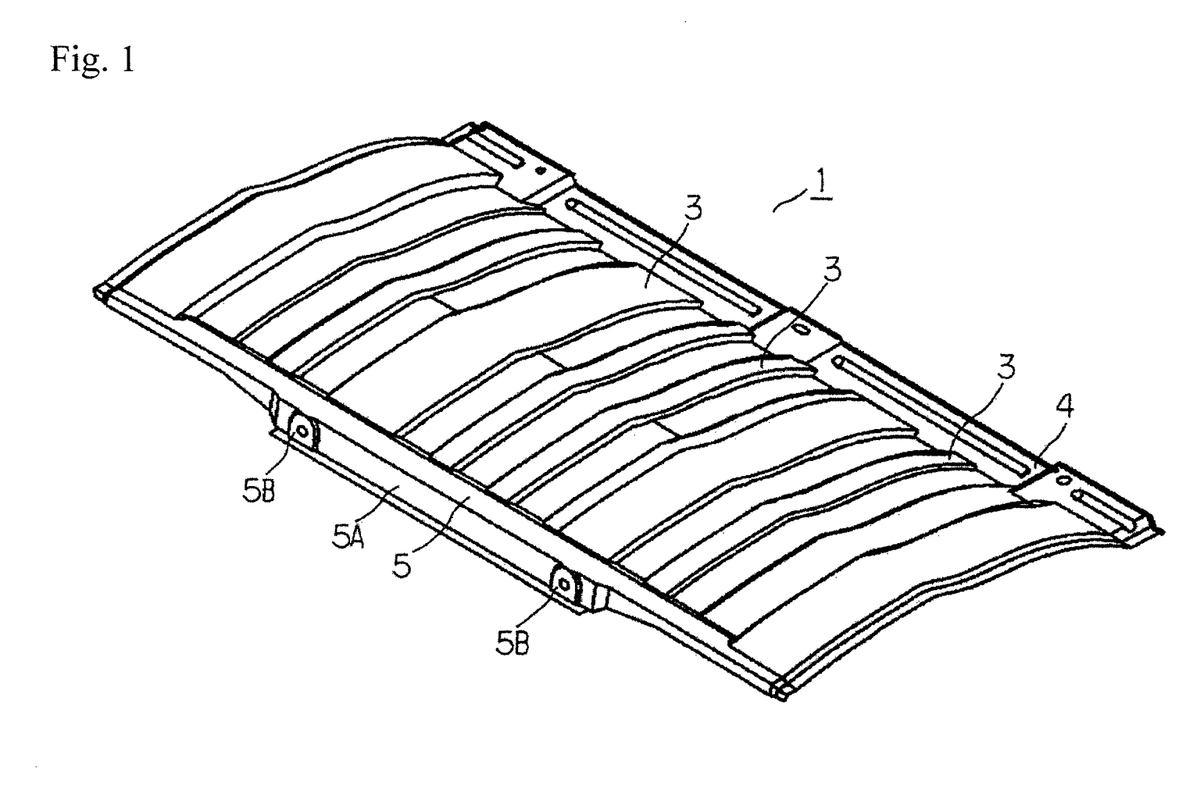
FIG. 1 is a perspective view illustrating a heat insulator before convex portions are formed thereon.
Figure 2:
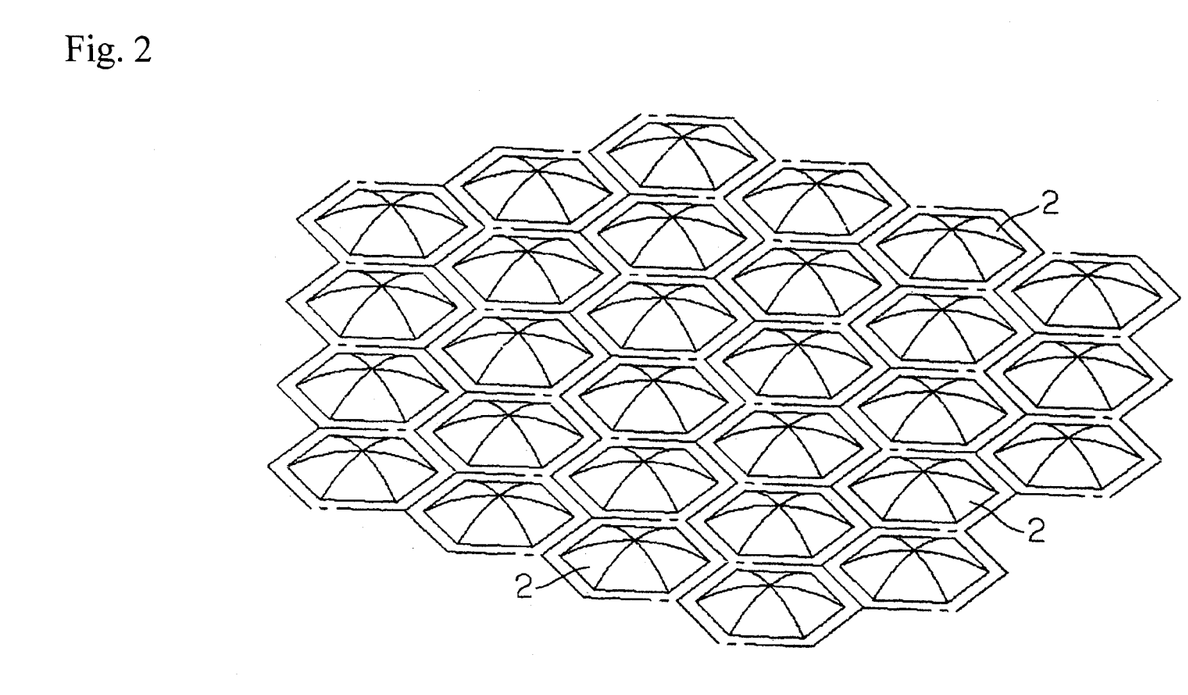
FIG. 2 is a partial perspective view illustrating the heat insulator after the convex portions of a first embodiment are formed thereon.
Figure 3:
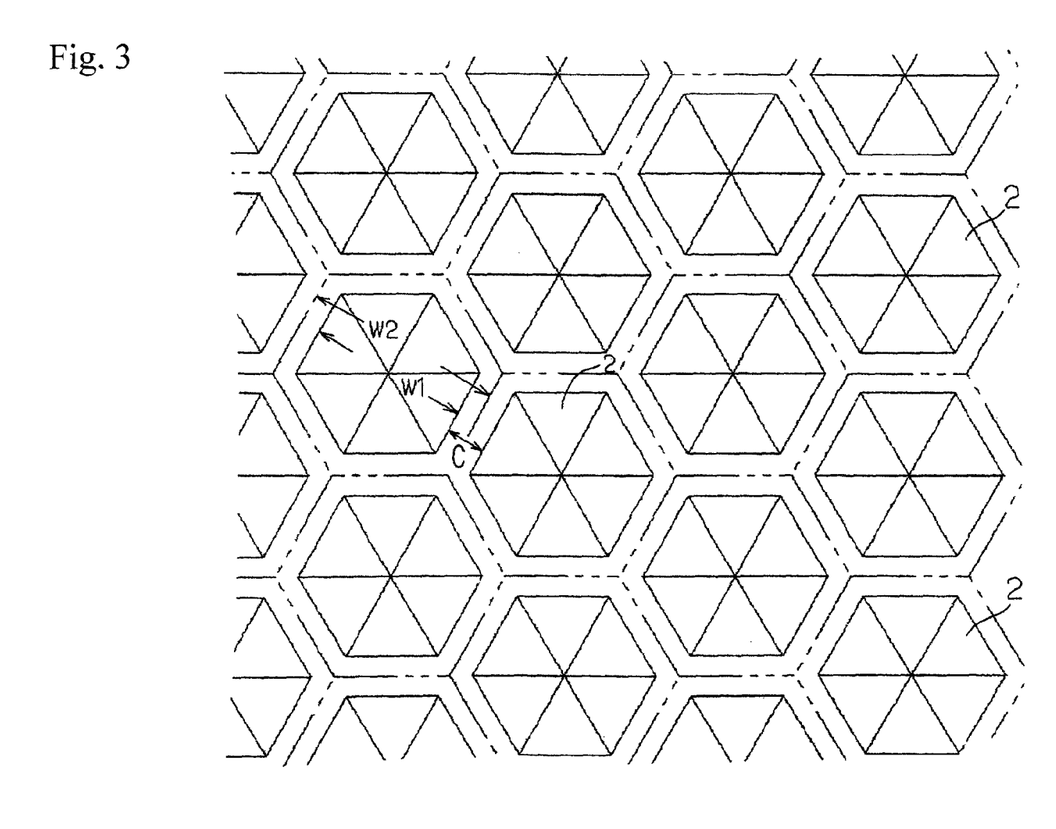
FIG. 3 is a partial_plan view illustrating the heat insulator after the convex portions of the first embodiment are formed thereon.

Hereinafter, a first embodiment of the invention applied to a heat insulator suitably used to insulate heat from a catalytic converter, a muffler, and the like of a vehicle will be described with reference to the drawings. FIG. 1 is a perspective view illustrating a heat insulator 1 before convex portions 2 are formed, FIG. 2 is a partial perspective view illustrating the heat insulator 1 after the convex portions 2 are formed. FIG. 3 is a partial plan view illustrating the heat insulator 1 after the convex portions 2 are formed.

The heat insulator 1 as a plate-like body is obtained by shaping a rectangular aluminum plate so as to protrude downward in a mountain shape. Its plate surface is provided with plural beads 3 which are formed in a protruding manner with a predetermined width at intervals in the length direction so as to cross the plate-like body. Then, plural convex portions 2 are formed at most parts of the plate surface of the heat insulator 1 except for side edge portions 4 and 5 formed along both sides of the heat insulator 1. The heat insulator 1 is attached to a vehicle body by inserting a bolt through an attachment hole 5B formed in a vertical side portion 5A of one side edge portion 5.

Next, a method of manufacturing the heat insulator 1 will be described. First, plural convex portions 2 are formed on the aluminum plate with a uniform thickness through embossing so that a flat plate portion between the convex portions 2 does not remain in a linear shape. The convex portions 2 are formed at the same interval. However, each one of the convex portions is formed in a hexagonal shape in a plan view, and has a longitudinal section thereof, which includes vertices forming opposing corners of the hexagonal shape, in a circular arc shape.

Then, the flat plate having the convex portions 2 formed thereon is press-formed in a manner such that it is inserted between upper and lower dies (not shown) having a predetermined gap defined by the final shape of the heat insulator therebetween. At this time, since the surfaces of the upper and lower dies have a predetermined gap therebetween, most part of the flat plate is press-formed in a desired shape while avoiding crushing of the convex portions 2 by the plate surfaces.

During the manufacturing procedure above, twenty three examples were manufactured as below. First, as shown in FIG. 4, the performance improvement rate was examined from the maximum displacement amount of twenty three examples manufactured by changing the height H of the convex portion 2 every 0.1 mm in the range of from 0.8 to 3.0 mm when the thickness of the aluminum plate body was set to 0.3 mm, the width W1 of the convex portion 2 was set to 8 mm, the base width W2 was set to 10 mm, and the plane dimension (C/2) was set to 1 mm.

Figure 4:
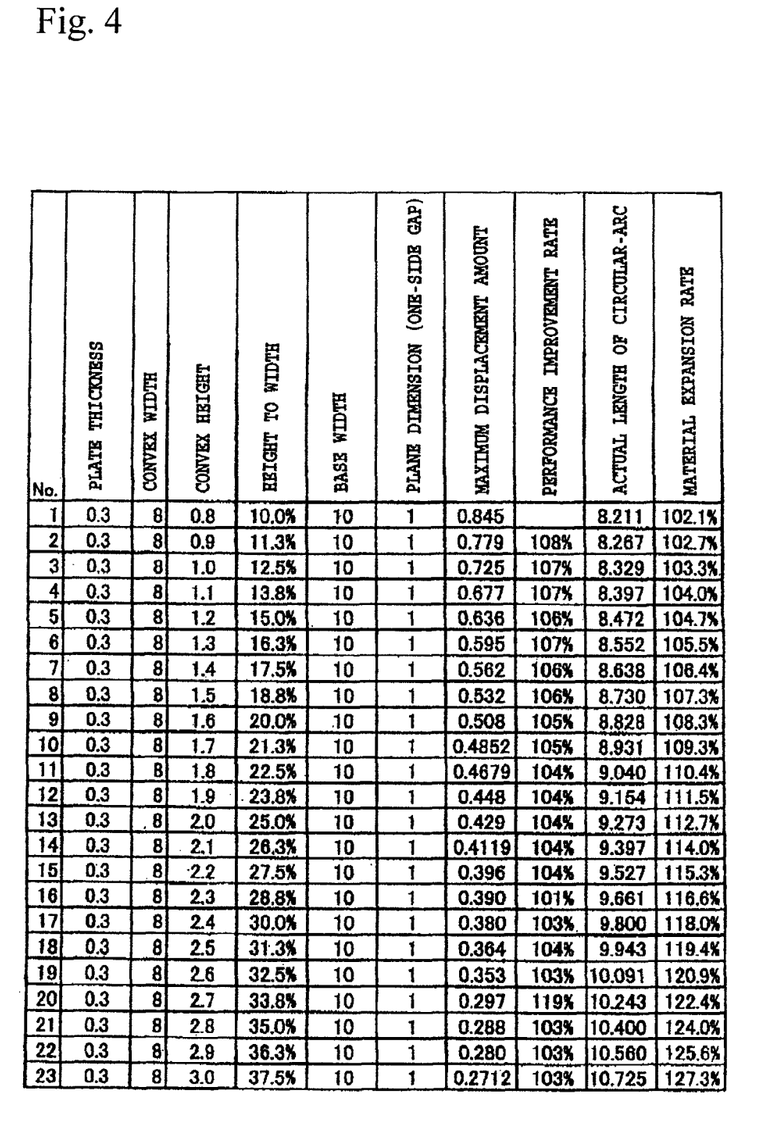
FIG. 4 is a table illustrating performance improvement rates obtained from maximum displacement amounts of twenty three examples which are manufactured by changing the convex height H every 0.1 mm in the range of from 0.8 mm to 3.0 ram while the thickness and the like of the aluminum plate body are fixed.

According to FIG. 4, in the first example, the convex height H to the convex width W1 is about 10.0%, and the maximum displacement amount is 0.845. In the second example, the height H to the width W1 is about 11.3%, the maximum displacement amount is 0.779, and the performance improvement rate (845/779) is about 108%. In the third example, the height H to the width W1 is 12.5%, the maximum displacement amount is 0.725, and the performance improvement rate (779/725) is about 107%. The performance improvement rate (725/677) of the fourth example is about 107%. Then, as below, the performance improvement rate (396/390) of the sixteenth example is about 101%, and the performance improvement rate (2800/2712) of the twenty-third example is about 103%. The description of the actual length of the circular-arc portion of the convex portion 2 or the material expansion rate will not be described here.

Accordingly, the optimal value of the convex height H to the convex width W1 is about 16.3% of the sixth example, on the brink of decrease of the performance improvement rate. However, it is thought that the satisfactory performance improvement rate is 105% or more, and the appropriate range of the convex height H to the convex width W1 is from 12% to 20.0%.

Next, the optimal value of the convex height H to the convex width W1 is about 16.3%, in view of the performance improvement rate of the sixth example of FIG. 4. When the optimal value of the convex height H to the convex width W1 is determined, there should be the optimal width W1 of the convex portion 2. When the width W1 is too small, the absolute height is riot sufficient and the rigidity may not be sufficient. On the other hand, when the width is too large, a planar component is more dominant than the plate thickness and the rigidity decreases. For this reason, as shown in FIG. 5, a difference in the performance with respect to the base was examined from the maximum displacement amount of the sixth example manufactured by changing the width WI of the convex portion 2 every 2 mm in the range of from 6 mm to 20 mm while the thickness of the aluminum plate body was set to 0.35 mm.

Figure 5:
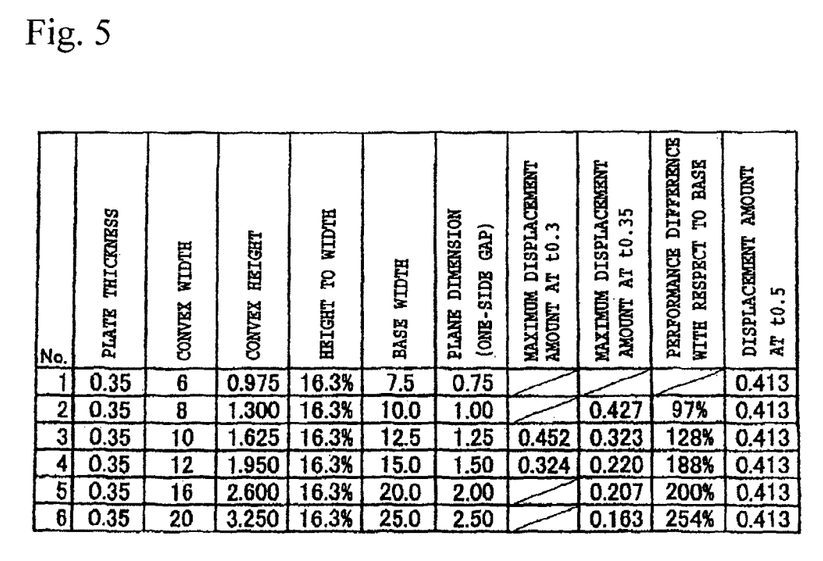
FIG. 5 is a table illustrating a performance difference with respect to a base, which is obtained based on maximum displacement amounts of six examples which are manufactured by changing the convex width W1 every 2 mm in the range of from 6 mm to 20 mm while the thickness of the aluminum plate body is fixed.

In the first example shown in FIG. 5, the convex width WI is 6 mm, the convex height H is 0.975, the convex height H to the convex width W1 is about 16.3%, the base width W2 is 7.5 mm, and the plane dimension (C/2) is 0.75 mm. In the second example, the convex width W1 is 8 mm, the convex height H is 1.300, the convex height H to the convex width W1 is about 16.3%, the base width W2 is 10.0 mm, the plane dimension (C/2) is 1.0 mm, the maximum displacement amount is 0.427, and a performance difference (413/427) with respect to the base is about 97%. In the third example, the convex width W1 is 10 mm, the convex height H is 1.625, the convex height H to the convex width W1 is about 16.3%, the base width W2 is 12.5 mm, the plane dimension (C/2) is 1.25 mm, the maximum displacement amount is 0.323, and a performance difference (413/323) with respect to the base is about 128%. Also, in the sixth example, the convex width W1 is 20 mm, the convex height H is 3.250, the convex height H to the convex width W1 is about 16.3%, the base width W2 is 25.0 mm, the plane dimension (C/2) is 2.50 mm, the maximum displacement amount is 0.163, and a performance difference (413/163) with respect to the base is about 254%. Further, the displacement amount when the thickness of the aluminum plate body is 0.3 mm or 0.5 mm will not be described.

As described above, when the convex width WI is changed, the displacement amount reduction rate decreases at a certain width W1. Then, it is supposed that the convex width W1 of which performance improvement is required is 12 mm of the fourth example, and the appropriate range of the convex width W1 is from 10 mm to 16 mm.

Figure 6:
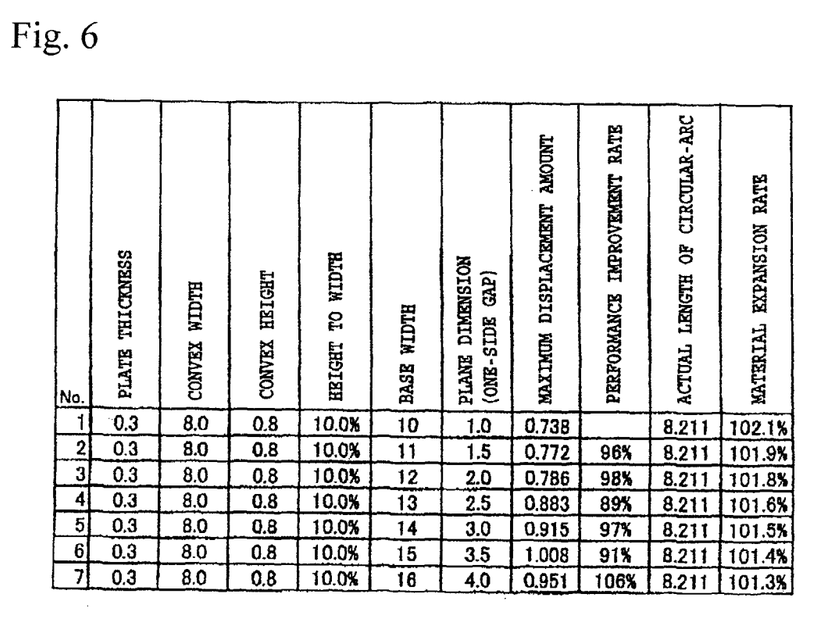
FIG. 6 is a table illustrating performance improvement rates with respect to the base, which are obtained based on the maximum displacement amounts of six examples which are manufactured by changing the base width W2 every 1 mm in the range of from 10 mm to 16 mm while the thickness and the like of the aluminum plate body are fixed.

Finally, the density of the convex portions 2 will be described. When the distance between the convex portions 2 increases, the material expansion rate resulting from embossing processing decreases, which is advantageous in the subsequent process in terms of formability but degrades the rigidity. Therefore, the examination was performed by focusing on the rigidity (smallness of displacement amount). That is, the performance improvement rate was examined from the maximum displacement amount of seven examples manufactured by changing the base width W2 every 1 mm in the range of from 10 mm to 16 mm when the thickness of the aluminum plate body was 0.3 mm, the convex width W1 was 8.0 mm, the convex height H was 0.8 mm, and the convex height H to the convex width W1 was 10.0%.

In the first example shown in FIG. 6, the base width W2 is 10.0 mm, the plane dimension (C/2) is 1.0 mm, the maximum displacement amount is 0.738, and the material expansion rate is 102.1%. In the second example, the base width W2 is 11.0 mm, the plane dimension (C/2) is 1.5 mm, the maximum displacement amount is 0.772, the performance improvement rate (738/772) is about 96%, and the material expansion rate is 101.9%. In the third example, the base width W2 is 12.0 mm, the plane dimension (C/2) is 2.0 mm, the maximum displacement amount is 0.786, the performance improvement rate (772/786) is about 98%, and the material expansion rate is 101.8%. In the fourth example, the base width W2 is 13.0 mm, the plane dimension (C/2) is 2.5 mm, the maximum displacement amount is 0.883, the performance improvement rate (786/883) is about 89%, and the material expansion rate is 101.6%. In the fifth example, the base width W2 is 14.0 mm, the plane dimension (C/2) is 3.0 mm, the maximum displacement amount is 0.915, the performance improvement rate (883/915) is about 97%, and the material expansion rate is 101.5%. In the sixth example, the base width W2 is 15.0 mm, the plane dimension (C/2) is 3.5 mm, the maximum displacement amount is 1.008, the performance improvement rate (915/1008) is about 91%, and the material expansion rate is 101.4%. Finally, in the seventh example, the base width W2 is 16.0 mm, the plane dimension (C/2) is 4.0 mm, the maximum displacement amount is 0.951, the performance improvement rate (1008/951) is about 106%, and the material expansion rate is 101.3%. The actual length of the circular-arc portion of the convex portion 2 or the material expansion rate will not be described herein.

As described above, the displacement amount tends to decrease as the plane dimension decreases, that is, the density of the convex portion 2 increases. However, when the base width W2 is 15 mm (less than twice the convex width W1), the performance improvement rate is reversed. Thus, the upper limit of W2 is considered to be 15 mm. Therefore, it is thought that the distance (6.0 mm) between the convex portions 2, which is as large as twice the plane dimension (C/2), may be desirably 75% or less of the base width W2 (8.0 mm).

Further, the absolute amount of the material expansion rate when the density is changed is extremely small within the range of the convex portion to be tested, and the formability thereof is not largely influenced. If only the rigidity is considered, the distance between the convex portions may be desirably set to zero. In this case, the hexagonal shape is the shape which may allow the distance to be as small as possible and improve the efficiency thereof. However, in the actual manufacturing stage, the planar portion is required. Further, since the planar portions are arranged so that a linear shape is not left between the convex portions 2 (refer to FIG. 3), the dynamic directivity does not exist, and the rigidity may be largely improved.

Figure 7:
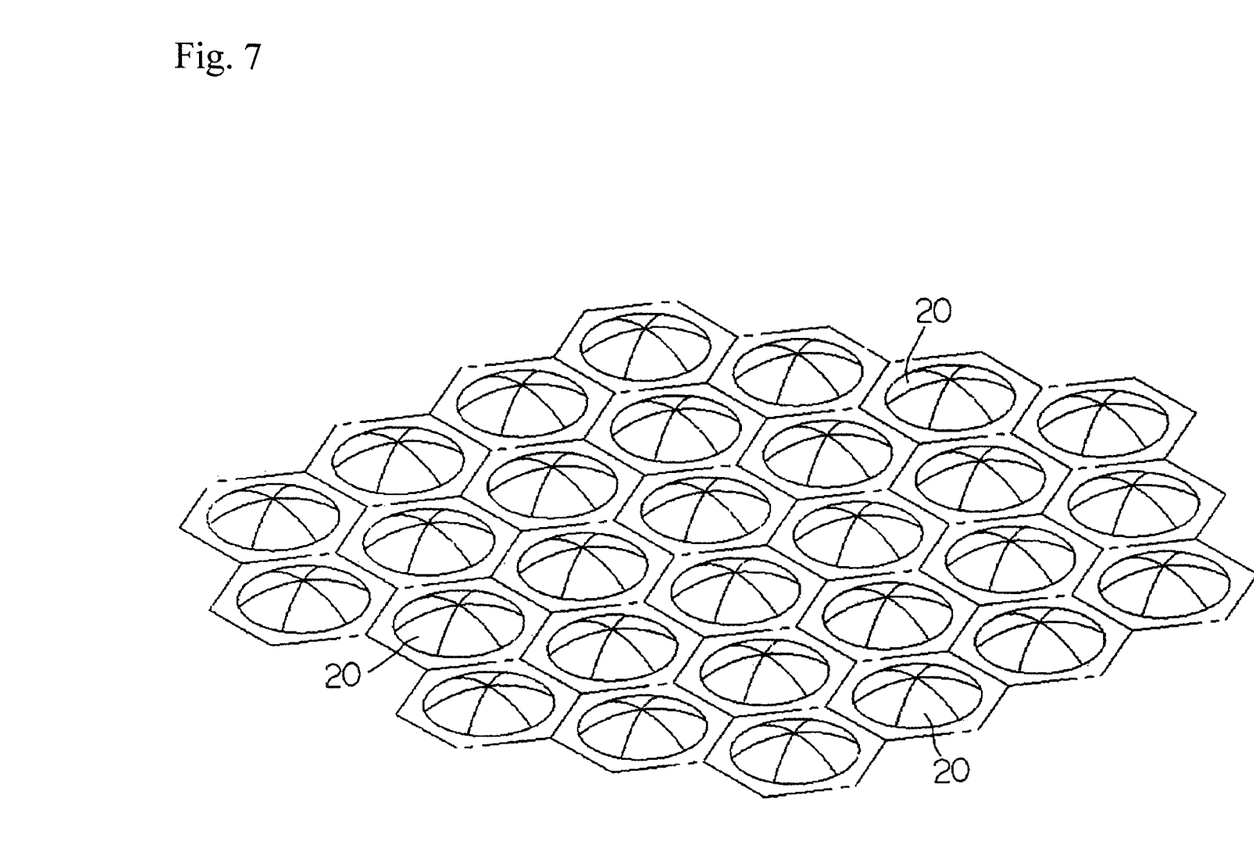
FIG. 7 is a partial perspective view illustrating the heat insulator after the convex portions of a second embodiment are formed thereon.
Figure 8:
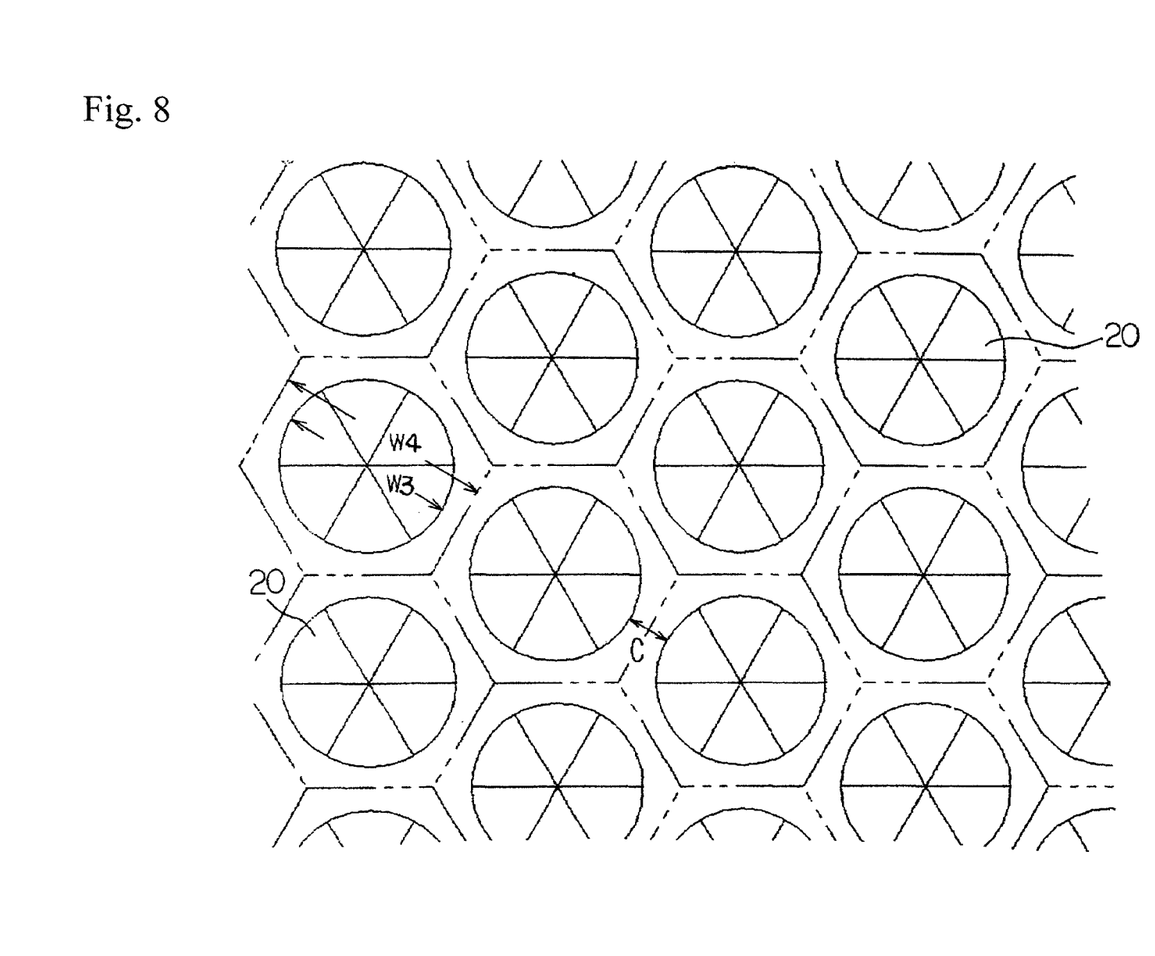
FIG. 8 is a partial plan view illustrating the heat insulator after the convex portions of the second embodiment are formed thereon.

Further, a second embodiment will be described with reference to FIGS. 7 and 8, where FIG. 7 is a partial perspective view illustrating a heat insulator 1 after convex portions 20 are formed, and FIG. 8 is a partial plan view illustrating the heat insulator 1 after the convex portions 20 are formed. The convex portions 20 formed on the heat insulator 1 are arranged in a manner such that the flat plate portion between the convex portions 20 does not remain in a linear shape, and the convex portions 20 are arranged at the same interval. The convex portion has a circular shape in a plan view and has a circular-arc-shaped longitudinal section. That is, the shape is like part of a sphere.

However, even in the second embodiment, as in the first embodiment, the convex height to the convex width W3 is in the range of from 12% to 20%; the convex width W3 is in the range of from 10 mm to 16 mm; and the distance between the convex portions 20 as large as twice the plane dimension (C/2) is 75% or less of the base width W4.

Figure 9:
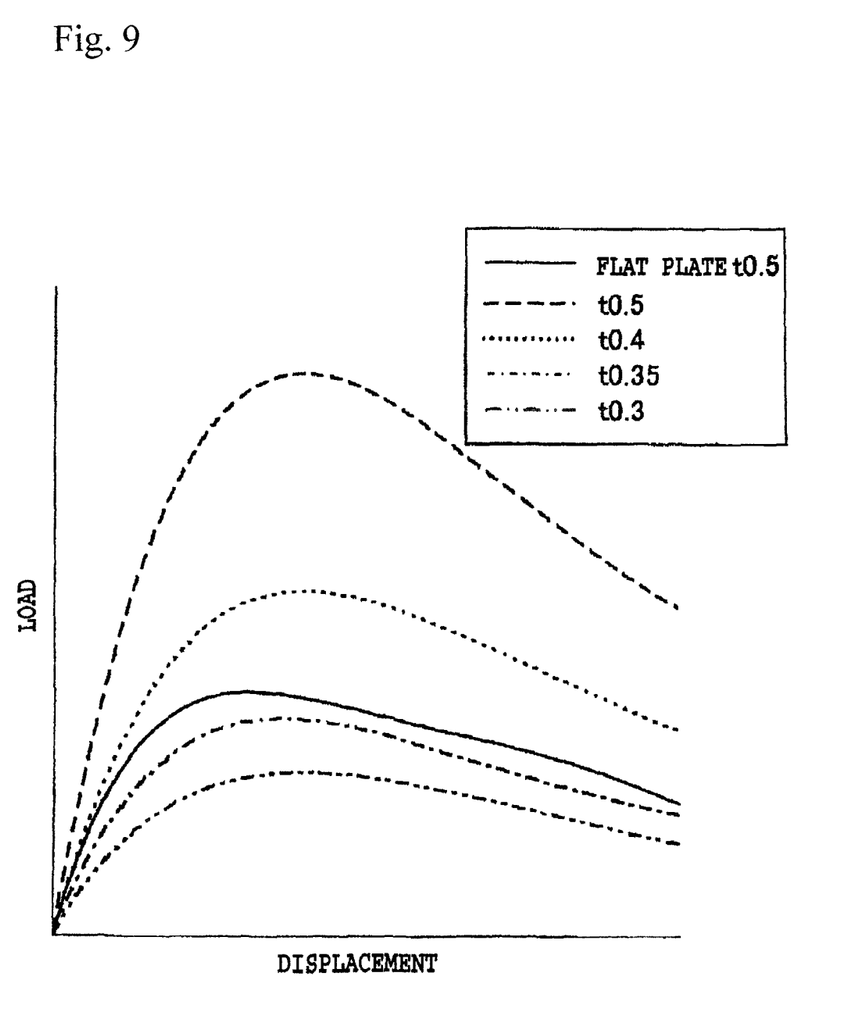
FIG. 9 is a diagram illustrating a relationship between a displacement amount and a load amount in the heat insulator having a thickness of 0.5 mm and no convex portions and the heat insulator having a different thickness from the first embodiment and having the convex portions of the first embodiment.

As described above, when the convex portions 2 or 20 are formed on the insulator 1 as in the first and second embodiments, even the aluminum plate having a thickness of about 0.35 mm may exhibit the same rigidity as that of the aluminum plate having a thickness of 0.5 mm and no convex portions 2 or 20 thereon. That is, as shown in FIG. 9, even the aluminum plate having a thickness of 0.375 mm and convex portions 2 thereon may exhibit the rigidity equal to or larger than that of the aluminum plate having a thickness 0.5 mm and no convex portions 2 thereon. FIG. 9 is a diagram illustrating a relationship between a displacement amount and a load amount in the heat insulator having a thickness of 0.5 mm and no convex portions and the heat insulator 1 having a different thickness from the first embodiment and having the convex portions 2 of the first embodiment.

Accordingly, even when the beads cannot sufficiently protrude or the beads cannot be formed on the entire plate surface, if the convex portions are formed on, the demanded rigidity may be ensured without increasing the thickness of the heat insulator. Significantly, it may be possible to avoid an increase in the weight and cost. In particular, when the flat plate portion between the convex portions does not remain in a linear shape, since the dynamic directivity is eliminated, the rigidity may be largely improved.

Figure 10:
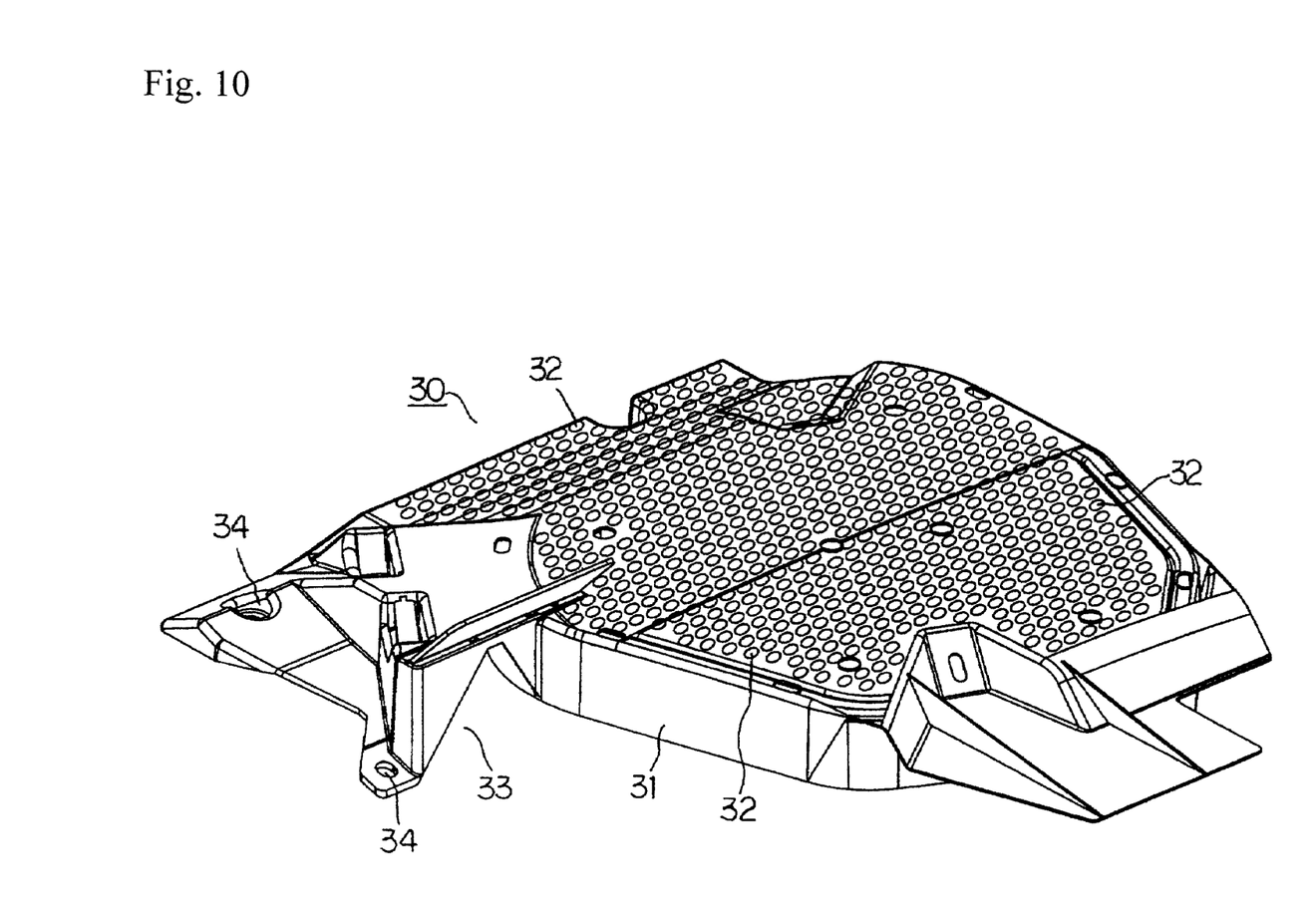
FIG. 10 is a perspective view illustrating an aerodynamic cover when viewed from the convex portions side of a third embodiment.

Next, a third embodiment applied to an aerodynamic cover 30 as a plate-like body will be described with reference to FIG. 10, where FIG. 10 is a perspective view illustrating the aerodynamic cover when viewed from the convex portions side. The aerodynamic cover 30 is a member that is fixed to the vehicle so as to cover the bottom surface of a vehicle body of a vehicle or the like, thereby to protect the bottom surface and reduce air resistance of the bottom surface.

Plural convex portions 32 are formed on the planar portion of the aerodynamic cover 30 except for the peripheral edge portion 31. Then, the aerodynamic cover 30 is attached to the bottom surface of the vehicle body of the vehicle by inserting a bolt through an attachment hole 34 formed in an attachment piece 33 formed in the peripheral edge portion 31. The surface having the convex portions 32 is used as the upper surface and the attachment surface and the concave portion contact the external air.

The aerodynamic cover 30 is formed by synthetic resin injection molding in which a molten synthetic resin is injected into and molded in a cavity formed between a movable die and a fixed die. The convex portions 32 are formed as in the first and second embodiments.

That is, the convex portions 32 are formed on the aerodynamic cover 30 at the same interval so that the flat plate portion between the convex portions 32 does not remain in a linear shape. As in the second embodiment, the convex portion 32 is formed in a circular shape in a plan view and has a circular-arc-shaped longitudinal section. That is, the shape is like part of a sphere. However, even in the third embodiment, as in the first and second embodiments, the convex height to the convex width W3 is in the range of from 12% to 20.0%, the convex width W3 is in the range of from 10 mm to 16 mm, and the distance between the convex portions 20 as large as twice the plane dimension (C/2) is 75% or less of the base width W4. Of course, the convex portions 32 are formed at the same interval. However, as in the first embodiment, each one of the convex portions may be formed in a hexagonal shape in a plan view, and may have a longitudinal section thereof, including vertices forming opposing corners of the hexagonal shape, in a circular arc shape.

Further, the invention may be applied the case in which a protector fender, an undercover, or the like of a vehicle is press-formed by using a resin. For example, such members are formed in such a manner that a resin sheet having glass fibers therein is heated and press-formed in a die. However, even in this case, when the convex portions are formed as in the third embodiment, the demanded rigidity of the plate-like body formed of a synthetic resin may be ensured without increasing the thickness, so that an increase in the weight and cost may be avoided.

The invention may be applied to various plate-like bodies (panels) such as a plate-like body formed of metal such as aluminum and a plate-like body formed of a synthetic resin for the purpose of ensuring sufficient rigidity without increasing the thickness thereof.

While the preferred embodiments of the invention have been described, various alterations, changes, or modifications may be made by the people skilled in the art on the basis of the description above, and the invention includes various alternates, changes, or modifications within the scope of the concept of the invention without departing the spirit of the present invention.

The invention claimed is:

1. A heat insulator that is used to insulate heat a catalytic converter or a muffler of a vehicle and that includes plural convex portions formed thereon, the plural convex portions being embossed on a metal plate, each one of the convex portions being formed in a hexagonal shape in a plan view, wherein a longitudinal section thereof, which includes vertices forming opposing corners of the hexagonal shape, has a circular arc shape, and wherein the convex portions are formed so that a convex height to a convex width is in the range of from 12% to 20%, the convex width being in the range of from 10 mm to 16 mm, and a distance between the convex portions being up to 75% of a base width, which base width is the sum of one-half of said distance between the convex portions and the convex width, the convex portions being arranged so that a flat plate portion between the convex portions does not remain in a linear shape.

* * * * *

UNITED STATES PATENT AND TRADEMARK OFFICE
CERTIFICATE OF CORRECTION

| | |
|---|---|
| PATENT NO. | : 8,557,395 B2 |
| APPLICATION NO. | : 13/003718 |
| DATED | : October 15, 2013 |
| INVENTOR(S) | : Susumu Sunaga |

It is certified that error appears in the above-identified patent and that said Letters Patent is hereby corrected as shown below:

In the Specification

Please correct Column 1, line 5 as follows:

from:   "The present invention relates to a beat insulator suitably ..."

to:   --The present invention relates to a heat insulator suitably ...--

Signed and Sealed this
Tenth Day of December, 2013

Margaret A. Focarino
*Commissioner for Patents of the United States Patent and Trademark Office*